United States Patent [19]
Kutsay

[11] 3,724,575
[45] Apr. 3, 1973

[54] FORCE DETECING AND EVALUATING APPARATUS

[76] Inventor: Ali Umit Kutsay, 3520 Lewis Road, Newtown Square, Pa.

[22] Filed: Jan. 24, 1972

[21] Appl. No.: 220,082

[52] U.S. Cl...............................177/211, 73/141 A
[51] Int. Cl.........G01g 3/14, G01g 21/14, G01g 3/10
[58] Field of Search.............177/210, 211; 73/141 A

[56] References Cited

UNITED STATES PATENTS

| | | | |
|---|---|---|---|
| 2,522,117 | 9/1950 | Holt et al. | 73/141 A |
| 2,597,751 | 5/1952 | Ruge | 177/211 |
| 2,601,781 | 7/1952 | Fillion | 73/141 A |
| 2,935,213 | 5/1960 | Cellitti et al. | 73/141 A |
| 3,046,782 | 7/1962 | Laimins | 73/141 A |
| 3,059,710 | 10/1962 | Pien | 177/211 |
| 3,180,139 | 4/1965 | Soderholm | 73/141 A |
| 3,411,348 | 11/1968 | Schultheis | 73/141 A |
| 3,439,761 | 4/1969 | Laimis | 177/211 |
| 3,448,424 | 6/1969 | Laimins | 73/141 A |
| 3,602,866 | 8/1971 | Saxl | 73/141 A |

FOREIGN PATENTS OR APPLICATIONS

| | | | |
|---|---|---|---|
| 61,946 | 12/1954 | France | 73/141 A |
| 989,747 | 5/1951 | France | 73/141 A |
| 1,186,238 | 2/1959 | France | 177/211 |

Primary Examiner—Robert S. Ward, Jr.
Attorney—Eugene E. Geoffrey, Jr.

[57] ABSTRACT

A bending type load detecting beam, preferably of cantilever construction, includes a load supporting portion and a detecting portion. The detecting portion is of uniform area moment of inertia, modulus of elasticity, and neutral axis of bending stress throughout its effective length. Electric-resistance strain gages are bonded to a longitudinal surface of the detecting portion initially parallel to but substantially spaced from the neutral axis in the beam's plane of bending. The gages are mounted at stations spaced a predetermined longitudinal distance apart from each other, and are aligned for longitudinal actuation along their common mounting line, making them responsive to bending of the beam's detecting portion. By this construction the mutual difference in response of the gages to any given force such as a weight applied via the loading portion, is rendered constantly proportional to the magnitude of the force, irrespective of the shape, center of gravity or position of the applied weight on the loading portion. The constantly proportional differential gage response may be metered by electrical means calibrated to indicate or record directly the actual magnitude of the applied force. The invention also includes apparatus employing a plurality of beams of the above type, instrumentally interconnected, for weighing materials not readily supportable on a single beam.

10 Claims, 9 Drawing Figures

FORCE DETECING AND EVALUATING APPARATUS

For many practical applications wherein it is desirable to use electrical strain gages as weight detecting elements, bending beam type weighing devices have advantages over directly vertical or column types, the advantages including simplicity, relatively low height, and the use of leverage to provide high sensitivity as well as adaptability to wide ranges of basic weighing capacities. However, the attainment of these and related advantages has hitherto been limited by the fact that the strain and consequent response of the gaging means have been dependent not only on the magnitude of the load but also on its particular position and resulting leverage effect on the beam, the latter effect being a function of the distance between the load's line of action and the instrumented beam station. Thus, with such devices it has been necessary not only to predetermine the center of gravity line of an unknown weight, but also to consider the distance of the c.g. line from the gaging point of reference (the latter distance being dependent on the exact location and position of the weight on its support), and finally to calculate the weight in terms of dividing the measured bending strain by the c.g. distance. The indirect nature of the above weighing procedure has rendered it too complicated for general practical purposes, a notable single illustration being in the case of weights of irregular shapes and/or compositions, with which attempted predetermination of the center of gravity alone, even if feasible, would constitute a cumbersome and time-consuming independent operation.

In view of the above and related considerations, an object of the present invention is to provide a strain-gaged sensitive beam structure adapted to produce an immediate and accurate measure of a force applied thereto, irrespective of the exact point or positioning of the applied force on the beam structure.

A further object is to provide a device of the above type which is well adapted to the accurate weighing of articles of regular or irregular shapes and/or compositions.

Another object is to provide a beam device of the above nature which is compact, simple, and readily instrumented with properly protected strain gages.

A further object is to provide a weighing device embodying substantially duplicate beams of the above type, for weighing loads not readily supportable on a single beam.

Other objects and advantages of the invention will become evident during the course of the following description in connection with the accompanying drawings, in which FIG. 1 is a longitudinal side view, partly in section, of a simple form of instrumented bending beam embodying the invention;

FIG. 4 illustrates the combination of two such beams suitable for use in fork trucks and the like;

Figure 6:
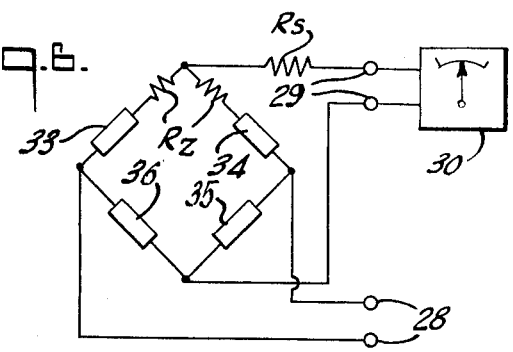
FIG. 6 shows a circuit for interpreting the strain detections of the four gages indicated in FIG. 4.
Figure 7:
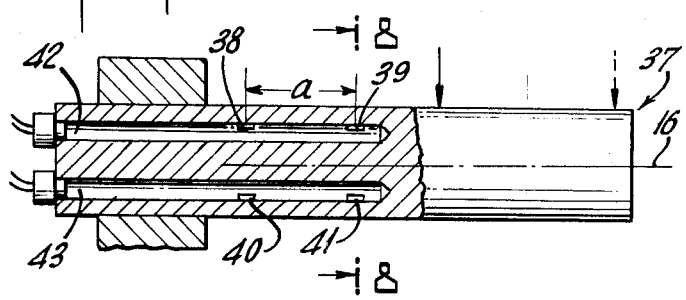

FIG. 6—A is a circuit diagram generally similar to FIG. 6 but illustrating the relative inclusion of the gages as arranged in an alternative form of beam shown in the following FIG. 7;

FIG. 7 is a longitudinal partial section of the alternative embodiment, and

Figure 8:
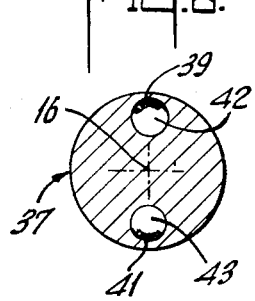

FIG. 8 is a cross section of the same in the plane 8—8, FIG. 7.

Figure 1:
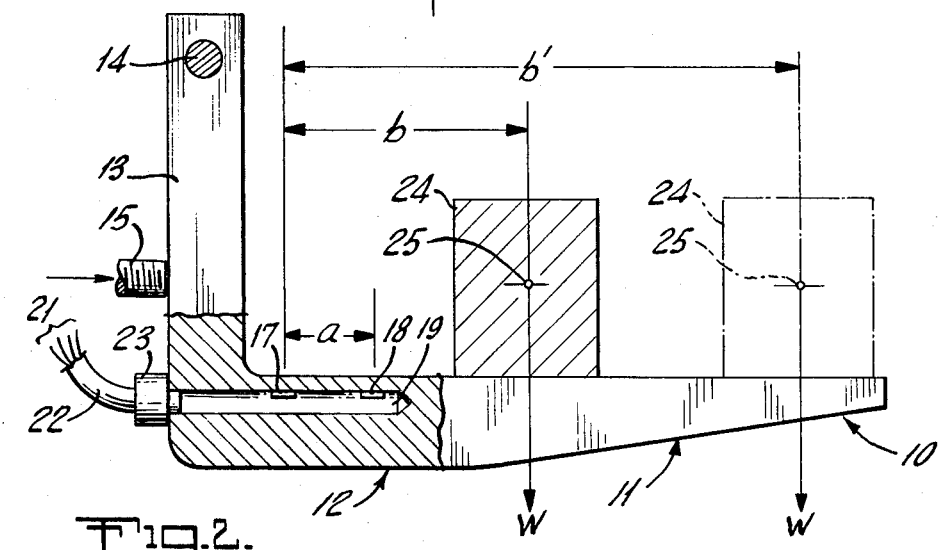

Referring to FIG. 1, the numeral 10 generally indicates a weighing beam including a load supporting portion 11 and an instrumented or detecting portion 12. For illustration the beam is shown as having a rear vertical arm 13 mounted on a stationary pivot 14 and provided with a backing stop 15, which latter, if desired, may be a screw adjustable for leveling purposes.

Figures 2, 3:
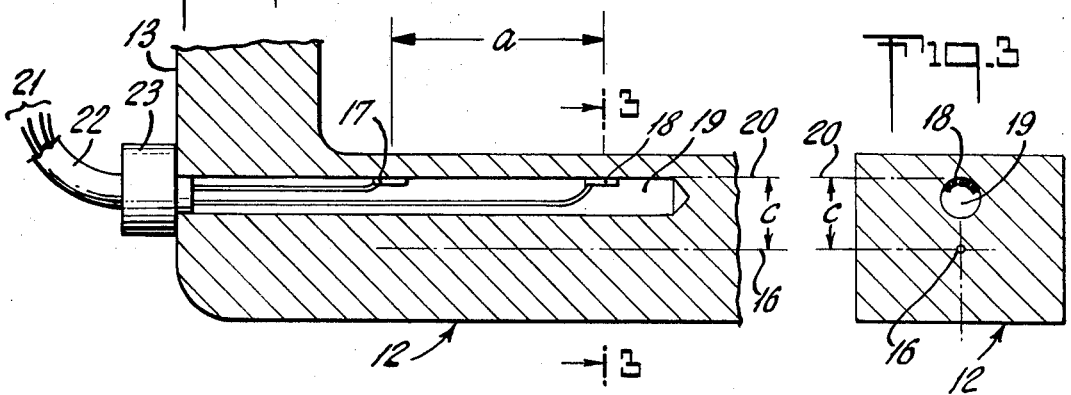
FIG. 2 is an enlarged sectional view of the beam's instrumented portion as indicated in FIG. 1.
FIG. 3 is a cross section taken in the plane 3—3, FIG. 2.

The instrumented portion 12 is made of homogeneous material having a uniform modulus of elasticity, and is of constant cross-sectional area throughout its effective length. Thus, it also has a continuous linear neutral axis about which bending takes place, this axis 16 being indicated in enlarged FIGS. 2 and 3. The embodiment shown in FIGS. 1, 2 and 3 has instrumentation comprising a pair of similar electrical-resistance strain gages 17 and 18, bonded by any suitable means for longitudinal response on a longitudinal surface of the beam portion 12, preferably the upper surface of a small hole 19 in the portion 12 parallel to but substantially above the neutral axis 16. Thus, the common line 20 of gage response, FIGS. 2 and 3, is at a distance "$c$" from the neutral axis 16 in the vertical plane of bending. This distance "$c$" is made as large as practical so as to maximize the sensitivity of the instrumented bending beam.

The gates 17 and 18 are spaced apart along the line 20 at a predetermined fixed distance "$a$." This distance is also significant in determing the sensitivity of the device, as will hereinafter become evident. Requisite electrical connections 21 from the gages 17 and 18 are provided via a cord 22 and suitable exterior fitting 23.

Capital letter W, FIG. 1, designates a load force exerted downward on the supporting portion 11 by an object 24 to be weighed, the effective line of action of W, obviously through the center of gravity 25 of the object 24, being located at a random distance "$b$" from the rear strain gage 17. For maximum accuracy of measurement, the direction of load force W must be perpendicular to neutral axis 16. While for purposes of simplicity in illustration the object 24 is shown as of rectangular shape, it will be understood that it may be of any other shape supportable on the beam. In the dot-and-dash representation, FIG. 1, the same object 24 is shown as farther out on the beam, so that the force W acts at a greater random distance "$b'$" from the gage 17.

The operational aspect of the beam device as typified in FIGS. 1, 2 and 3, is best set forth in the following brief mathematical analysis based on the well-known flexing characteristics of such beams, in which analysis:

"$E$" is the modulus of elasticity of the material, typically but not necessarily metallic, composing the instrumented portion 12 of the beam;

"$I$" is the beam area moment of inertia, which due to the structure of the portion 12 as previously noted, is uniform between and including the effective longitudinal stations of the gages 17 and 18;
"$e_{17}$" is the strain at the station of gage 17;
"$e_{18}$" is the strain at the station of gage 18;
"$W$" is the unknown applied force to be measured;
"$a$," "$b$" and "$c$," as previously listed, are respectively the effective distance between gages 17 and 18, the effective distance of the gage 17 from the load line of $W$, and the spacing of the common gaging line 20 from the beam's neutral axis 16.

In accordance with the above mentioned typical characteristics of the beam portion 12, $$e_{17} = Wcb/EI \qquad \text{i}$$

$$e_{18} = Wc(b-a)/EI \qquad \text{ii}$$

$$e_{17} \text{ minus } e_{18} = Wcb - Wc(b-a)/EI = Wca/EI \qquad \text{iii}$$

Figure 5:
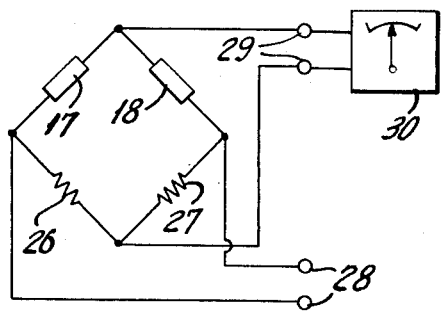
FIG. 5 shows a typical Wheatstone bridge circuit for interpreting the strain effects detected by the two gages indicated in FIGS. 1 and 2.

Equation iii shows that the distance factor $b$ is eliminated. The factors $E$, $I$, $a$ and $c$ are constants. Thus, it will be evident that the force $W$ is proportional directly to the difference between the strains $e_{17}$ and $e_{18}$, and, therefore, to the difference between the electrical-resistive responses of the gages 17 and 18. To measure and interpret the latter difference, the gages may be connected in adjacent legs of a Wheatstone bridge arrangement as illustrated in FIG. 5, in which 26 and 27 represent initially fixed resistors and leads 28 supply the actuating potential. Since the operation of Wheatstone bridge circuits is very well known, further immediate description herein would be superfluous, except to note that by the above arrangement the cross terminals 29 carry a measure of the resistive difference between gages 17 and 18, which difference may be led to any desired indicating or recording means 30 calibrated in direct terms of the force $W$.

The foregoing demonstrates that the accurate determination of the load force $W$ depends only on the intergaging distance $a$, FIGS. 1 and 2, without regard to the outward distance $b$ of $W$ on the beam; the only limitation being that the action line of $W$ does not fall between the gages, in other words, that $W$ bears somewhere on the supporting portion 11. If appropriate in some applications, stop means may be provided to prevent accidental encroachment on "$a$." Incidentally, in beam structures wherein the weight of the beam's loading portion 11 itself may be enough to cause any significant difference in the strains $e_{17}$ and $e_{18}$, the resistors 26 and 27, (FIG. 5), may be of the trimmer type settable initially to eliminate any such "tare" effect from the bridge's useful response solely to the imposed load.

For further illustration of the device's accuracy independently of the particular position of the force $W$ and hence of the object 24, reference may be made to the phantom view, FIG. 1, in which the object 24 is moved outward so that load force $W$ acts at distance $b'$ from the gage 17. By substitution of $b'$ for $b$ in the foregoing equations, it will be seen that distance $b'$ is similarly eliminated, the relationship remaining $(e_{17} - e_{18}) = Wca/EI$, so that the strains on the gages 17 and 18 and the consequent difference between their resistive response still provide the same relative measure of the force or weight $W$.

Figure 4:
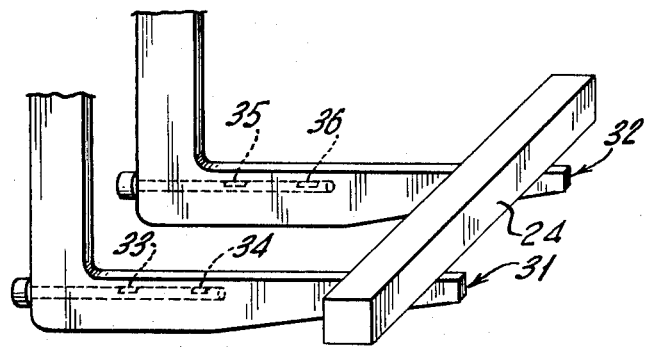

The embodiment of the invention shown in FIG. 4 illustrates its use in applications wherein the objects 24 to be weighed are too long or bulky to be accommodated readily on a single beam structure. For these applications a pair or dual set of spaced parallel beams 31 and 32 may be provided, each beam equipped with strain detection means as described previously. A typical use of this type of structure is in fork lift trucks for handling bulky items in industrial plants, in which case the instrumentation of the fork permits weighing of the items as they are being handled or transported. In such a dual structure, FIG. 4, the beam 31 is instrumented with spaced strain gages 33 and 34, while beam 32 has gages 35 and 36. The distances between the gage pairs (as "$a$" in FIG. 1) are essentially the same in the two beams, and the beams per se preferably have similarly equal properties (areas, moduli, etc.), to assure maximum operational accuracy of the system.

With the item 24 supported on two beams, as illustrated, each beam receives its fractional share of the applied force $W$ and hence acquires its particular strain difference response in its gaging or detecting portion. The relationships of each of these individual strain differences to its particular fractional applied force may of course be analyzed as in the foregoing equations. However, since the two fractional forces always together equal the whole force $W$, regardless of the relative proportions of the two fractions, and in view of the practical identity of constants in the two beams, it will be evident that the sum of the two resultant strain differences represents the determining factor in measurement of the total force $W$, that is:

$$(e_{33} - e_{34} + e_{35} - e_{36}) = Wca/EI \qquad \text{iiii}$$

To utilize the above relationship, the four gages of FIG. 4 may be incorporated in the bridge circuit shown in FIG. 6, which also includes trimming resistors $R_z$ for zero setting and $R_s$ for adjusting sensitivity respectively. Bridge circuits being, as noted, well known in the electrical art, it will be seen by those skilled therein that the output through terminals 29 again represents a single measure readily translatable into direct indication or recording of the total applied force $W$. It will also be noted that since neither the two fractional amounts of force nor their longitudinal positions (the latter factors eliminated as in the case of a single beam) enter the governing equation iiii, item 24 may be placed at any random position, straight or askew, on the loading portion of the structure without impairing the accuracy of the measurable result.

Figure 6A:
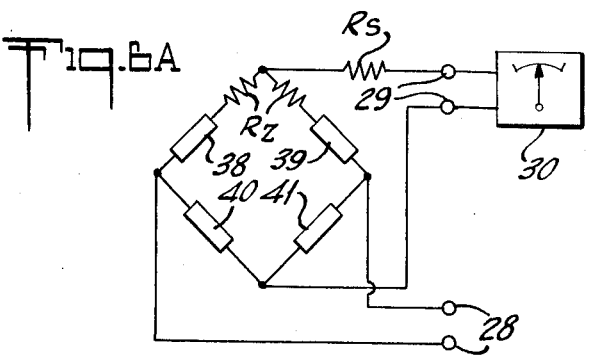

A further embodiment of the invention is shown in FIGS. 7 and 8, wherein a single beam 37 is equipped with a first pair of gages 38 and 39, and a second pair 40 and 41, the two pairs being located in similar stations respectively on the longitudinal surfaces of holes 42 and 43, drilled parallel to but above and below the neutral axis 16 and preferably with equal inter-gage spacings. The beam 37 is illustrated as cylindrical rather than rectangular, but it may be of other comformations such as octagonal, hexagonal, or I-beam, etc., so long as the previously listed physical characteristics are kept effectively constant throughout the beam's detecting portion. With this structure, if the applied force is downward as in weighing, the upper gages 38 and 39 are subjected to tensional strain, while the strains in the lower pair 40 and 41 are compressional. To utilize both these factors so that their determining effects in an individual beam may be additive and hence productive of maximum sensitivity, the bridge circuit shown in FIG. 6A may be employed, which circuit will be observed to be the same as that of FIG. 6 except for the appropriate redistributions of the various gages. On the other hand, when the relative direction of load application is reversed, as may be the case in industrial uses other than direct weighing, the gages of pair 38 and 39 are subjected to compressional strain while 40 and 41 are strained in tension; however, such reversal in no way impairs the accuracy of the device in reporting the applied load through the circuit of FIG. 6A. The same reversal principle pertains to the embodiments shown in FIGS. 1 and 4.

From the foregoing description it will be seen that the invention provides simple, practical and rapidly effective means, not hitherto available, for measuring certain weights and forces which cannot otherwise be determined with desirable speed and precision. A simple example may be cited as the weighing of a load of luggage being conveyed for a traveller to an airplane, on a truck embodying the general structure of FIG. 4. Such a load, rather than comprising a single homogeneous object, may consist of a conglomeration of various shapes and sizes of grips, bags, etc., each having its own weight and individual distribution of loading. But with the present invention's independence of the shape, distribution and composite load force application point on the supporting portion or platform, the total weight may be indicated at once.

Utilization of the interior surfaces of holes for the longitudinal gage mounting surfaces, while not obligatory, is advantageous in affording gage protection in use without additional seals or the like. The beam material, though usually steel, may in some cases be of other suitable materials; for instance, where response to very light loading is required, the beam's material, particularly in its detecting portion, may be a stable plastic having a lower modulus of elasticity. Similarly, while in the foregoing explanation the beems have been shown as horizontal with the unknown forces applied vertically thereto in the ordinary gravitational sense as in simple weighing, in an application wherein the force to be measured occurs at some other angle, the angular direction of the beam may be varied accordingly. In such cases the term "vertical" defining the displacement of the gaging surface from the beam's neutral axis, is employed in its purely geometric sense, i.e., as denoting distance at right angles with the axis. Thus, while the invention has been set forth in typical preferred embodiments, it is not limited to the exact forms illustrated, as various modifications may be made without departing from the invention concept as defined in the scope of the appended claims.

I claim:

1. In force detecting and evaluating apparatus, in combination, a bending beam including a detecting portion and a loading portion extending longitudinally from said detecting portion, said detecting portion having a neutral axis of bending stress and a gage mounting surface linearly parallel to said axis and spaced a substantial relatively vertical distance therefrom in the bending plane of said beam, and a pair of longitudinally orientated electrical-resistance strain gages bonded to said surface at two stations spaced a predetermined longitudinal distance apart to provide differing station strains and respective gage detections in response to a load force transmitted to said detecting portion by said loading portion; said detecting portion being of uniform modulus of elasticity and area moment of inertia throughout its effective length, whereby the said difference between gage detections is in constant fixed proportion to the magnitude of said load force, irrespective of the particular location on said loading portion at which said force may be effectively applied.

2. Apparatus according to claim 1 wherein said longitudinal gage mounting surface comprises a peripheral zone of a hole disposed in said detecting portion in initial parallelism with said neutral axis.

3. Apparatus according to claim 1 including electrical circuit means operationally incorporating said gages and adapted to translate said constant proportion of said detecting difference to said magnitude of applied force into direct indication of said magnitude.

4. Apparatus according to claim 1 wherein said bending beam extends in a substantially horizontal direction for weighing accurately an item placed at random on said loading portion of said beam, the total weight of said item constituting the force applied through the center of gravity of said item to said loading portion irrespective of the shape, composition or the placement of said item on said loading portion.

5. Apparatus according to claim 1 including a similar second bending beam structurally associated with said first beam but laterally spaced therefrom, said second beam having a second pair of strain gages disposed in said inter-gage spaced relation, whereby a total force applied at random to both the loading portions of said two beams may produce individual differential detective responses in said two pairs of gages, said differential response by each pair of gages being in constant proportion to the fraction of said total loading force applied to said pair's respective beam.

6. Apparatus according to claim 5 including electrical circuit means operationally incorporating both said pairs of gages and adapted to translate said two fractionally detected proportions into a single direct indication of said total load force.

7. Apparatus according to claim 1 wherein said detecting portion of said beam has a second longitudinal mounting surface initially parallel to said first mounting surface, and including a second pair of longitudinally orientated and spaced strain gages bonded to said second surface, said second surface being spaced from said neutral axis on the opposite side of said axis with respect to said first surface, whereby differential detection by one of said pairs of gages may be responsive to tensional strains while differential response of the other pair is to compressional strains in said beam.

8. Apparatus according to claim 7 including electrical circuit means operationally incorporating both said pairs of gages and adapted to translate said tensional and compressional gage differential detections additively to a direct indication of the applied straining force, whereby said detectional combination may function with maximum resultant sensitivity.

9. Apparatus according to claim 2 wherein said second longitudinal mounting surface comprises a peripheral zone of a second longitudinal hole disposed in said beam's detecting portion in initially parallel relation with said first hole and said neutral axis.

10. Apparatus according to claim 7 wherein said second longitudinal mounting surface comprises a peripheral zone of a second longitudinal hole disposed in said beam's detecting portion in initially parallel relation with said first hole and said neutral axis.

* * * * *